(12) United States Patent
Garrido et al.

(10) Patent No.: US 11,322,172 B2
(45) Date of Patent: May 3, 2022

(54) COMPUTER-GENERATED FEEDBACK OF USER SPEECH TRAITS MEETING SUBJECTIVE CRITERIA

(71) Applicant: Microsoft Technology Licensing, LLC, Redmond, WA (US)

(72) Inventors: Oscar Roberto Morales Garrido, Shoreline, WA (US); Paul Thackray, Seattle, WA (US); Kristen Kennedy, Seattle, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 774 days.

(21) Appl. No.: 15/611,754

(22) Filed: Jun. 1, 2017

(65) Prior Publication Data
US 2018/0350389 A1 Dec. 6, 2018

(51) Int. Cl.
| | |
|---|---|
| G10L 25/51 | (2013.01) |
| G06Q 10/10 | (2012.01) |
| H04M 3/51 | (2006.01) |
| G06Q 30/00 | (2012.01) |
| G09B 19/04 | (2006.01) |
| G10L 25/90 | (2013.01) |
| G10L 25/48 | (2013.01) |
| G10L 15/26 | (2006.01) |

(52) U.S. Cl.
CPC ............. *G10L 25/51* (2013.01); *G09B 19/04* (2013.01); *G10L 25/48* (2013.01); *G10L 25/90* (2013.01); *G10L 15/26* (2013.01)

(58) Field of Classification Search
CPC .. H04M 3/5175; G06Q 30/00; G06Q 30/0631

USPC .......................................................... 705/14.66
See application file for complete search history.

(56) References Cited

U.S. PATENT DOCUMENTS

| | | |
|---|---|---|
| 5,857,173 A | 1/1999 | Beard et al. |
| 5,920,838 A | 7/1999 | Mostow et al. |
| (Continued) | | |

OTHER PUBLICATIONS

"Speech Tutor", Published on: Feb. 5, 2015 Available at: https://itunes.apple.com/US/app/speech-tutor/id424752543?mt=8.

*Primary Examiner* — Farzad Kazeminezhad
(74) *Attorney, Agent, or Firm* — Calfee, Halter & Griswold LLP

(57) ABSTRACT

Computer-generated feedback directed to whether user speech input meets subjective criteria is provided through the evaluation of multiple speaking traits. Initially, discrete instances of various multiple speaking traits are detected within the user speech input provided. Such multiple speaking traits include vocal fry, tag questions, uptalk, filler sounds and hedge words. Audio constructs indicative of individual instances of speaking traits are isolated and identified from appropriate samples. Speaking trait detectors then utilize such audio constructs to identify individual instances of speaking traits within the spoken input. The resulting quantities are scored based on reference to predetermined threshold quantities. The individual speaking trait scores are then amalgamated utilizing a weighting that is derived based on empirical relationships between those speaking traits and the criteria for which the user's speech input is being evaluated. Further adjustments thereof can be made by separately, manually weighting the previously determined quantities.

18 Claims, 7 Drawing Sheets

(56) References Cited

U.S. PATENT DOCUMENTS

| | | | |
|---|---|---|---|
| 7,299,188 B2 | 11/2007 | Gupta et al. | |
| 8,109,765 B2 | 2/2012 | Beattie et al. | |
| 8,306,822 B2 | 11/2012 | Li et al. | |
| 9,159,054 B2* | 10/2015 | Odinak | H04M 3/5175 |
| 2006/0063139 A1 | 3/2006 | Carver et al. | |
| 2008/0033826 A1* | 2/2008 | Maislos | G06Q 30/00 705/14.66 |
| 2008/0140412 A1 | 6/2008 | Millman et al. | |
| 2011/0082698 A1 | 4/2011 | Rosenthal | |
| 2011/0313762 A1 | 12/2011 | Ben-David et al. | |
| 2014/0074470 A1 | 3/2014 | Jansche et al. | |
| 2016/0189566 A1 | 6/2016 | Rot et al. | |
| 2017/0221126 A1* | 8/2017 | Leong | G06Q 30/0631 |

* cited by examiner

COMPUTER-GENERATED FEEDBACK OF USER SPEECH TRAITS MEETING SUBJECTIVE CRITERIA

BACKGROUND

Traditionally, the analysis of human speech on computing devices has been limited to simplistic comparisons between previously received speech input acting as a standard, and newly received speech input. Thus, for example, a user seeking to learn a new language can have their pronunciation of words or phrases in that language compared to those of, for example, a native speaker, and a computing device can perform such a comparison through known audio comparison algorithms and generate feedback as to whether the user's pronunciation is the same as, or differs from that of the reference speaker. Such direct comparison analysis of human speech on computing devices has also been utilized to aid users with speech impediments or other medical conditions that cause such users to pronounce sounds, words or phrases differently than a reference speaker.

Within business, or professional, environments, computing devices have not been able to provide feedback regarding subjective criteria such as whether a user's speech is persuasive, engaging, confident, or other like subjective criteria. To the contrary, computer-generated analysis of user speech within such business environments has been limited to analysis of the words chosen by a user, such as grammatical analysis, instead of aural analysis, or very simplistic aural analysis, such as how quickly the user is speaking. Such evaluations may provide useful feedback only for untrained speakers who make very simple mistakes, such as speaking too quickly, or using improper grammar, that can be identified through such limited analysis. However, such evaluations do not provide any feedback regarding whether the user speaking meets subjective criteria, such as whether they are speaking in a persuasive or confident manner.

SUMMARY

To provide users with computer-generated feedback directed to whether user speech input meets subjective criteria, multiple speaking traits can be evaluated and feedback can be provided based on an amalgamation of such evaluations. Initially, discrete instances of various multiple speaking traits can be detected within the user speech input provided. Such multiple speaking traits include vocal fry, tag questions, uptalk, filler sounds and hedge words. Audio constructs indicative of individual instances of speaking traits can be isolated and identified from appropriate sample speech containing such speaking traits. Speaking trait detectors can utilize such audio constructs to identify individual instances of speaking traits within the spoken input provided by the user. The resulting quantities can be scored based on reference to predetermined threshold quantities. The individual speaking trait scores can then be amalgamated utilizing a weighting that can be derived based on empirical relationships between those speaking traits and the criteria for which the user's speech input is being evaluated. Computer-generated feedback can then be provided based on such an amalgamated score, or based on further adjustments thereof, such as adjustments made by separately weighting the previously determined quantities of instances of speaking traits within the spoken input provided by the user with manually adjusted weights based on independent research or other like external factors, thereby providing the feedback system with manual adjustment capability.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Additional features and advantages will be made apparent from the following detailed description that proceeds with reference to the accompanying drawings.

DESCRIPTION OF THE DRAWINGS

The following detailed description may be best understood when taken in conjunction with the accompanying drawings, of which.

DETAILED DESCRIPTION

Figure 1:
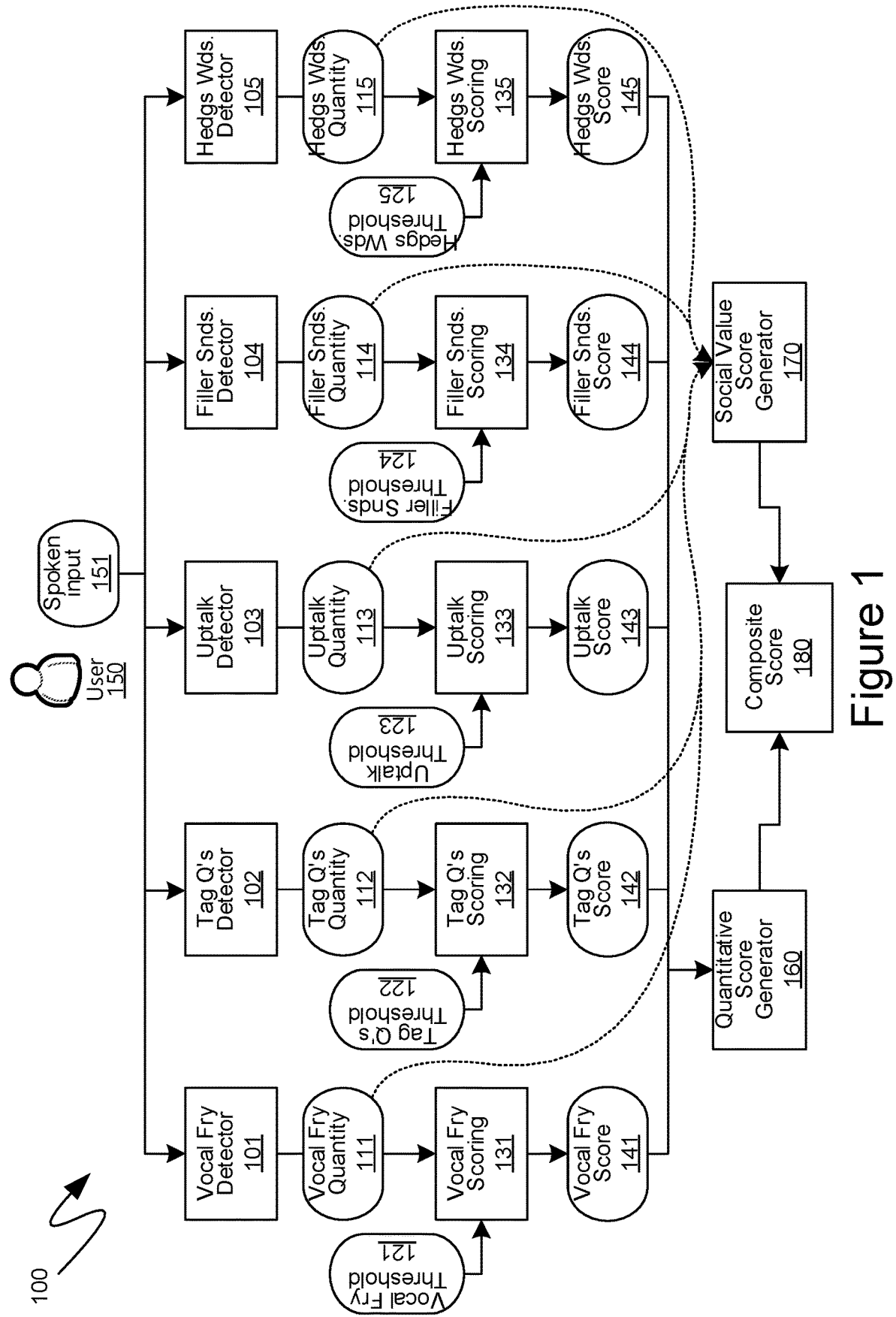
FIG. 1 is a system diagram of an exemplary system for providing computer-generated feedback directed to whether user speech input meets subjective criteria.

The following description relates to the provision of computer-generated feedback directed to whether user speech input meets subjective criteria. Multiple speaking traits can be evaluated and feedback can be provided based on an amalgamation of such evaluations. Initially, discrete instances of various multiple speaking traits can be detected within the user speech input provided. Such multiple speaking traits include vocal fry, tag questions, uptalk, filler sounds and hedge words. Audio constructs indicative of individual instances of speaking traits can be isolated and identified from appropriate sample speech containing such speaking traits. Speaking trait detectors can utilize such audio constructs to identify individual instances of speaking traits within the spoken input provided by the user. The resulting quantities can be scored based on reference to predetermined threshold quantities. The individual speaking trait scores can then be amalgamated utilizing a weighting that can be derived based on empirical relationships between those speaking traits and the criteria for which the user's speech input is being evaluated. Computer-generated feedback can then be provided based on such an amalgamated score, or based on further adjustments thereof, such as adjustments made by separately weighting the previously determined quantities of instances of speaking traits within the spoken input provided by the user with manually adjusted weights based on independent research or other like external factors, thereby providing the feedback system with manual adjustment capability.

The techniques described herein make reference to "speaking traits", such as vocal fry or tag questions. As utilized herein, the term "speaking traits" means tonal attributes of speech that are individually identifiable by unique audio characteristics or constructs. Vocal fry is an example of a "speaking trait" as that term is defined and utilized herein. As utilized herein, the term "vocal fry" means a popping or creaking sound produced during speaking. Tag questions are another example of a speaking trait. As utilized herein, the term "tag questions" means a grammatical structure in which a declarative statement, or an imperative, is turned into question by appending an interrogative fragment at the end of such a declarative statement or imperative. Uptalk is yet another example of a speaking trait. As utilized herein, the term "uptalk" means a rising intonation pattern such that declarative phrases or sentences are spoken with rising intonation at the end, as if they were questions. Filler sounds are yet another example of a speaking trait. As utilized herein, the term "filler sound" means a contextually meaningless word, phrase or sound that is made during a pause or hesitation while speaking. Hedge words are yet another example of a speaking trait. As utilized herein, the term "hedge word" means a mitigating word, often an adjective, or a mitigating sound or verbal construction, that is used to lessen the impact of a spoken statement. Other speaking traits are also known to those skilled in the art and the above examples are meant to be illustrative and not exclusive.

Although not required, the description below will be in the general context of computer-executable instructions, such as program modules, being executed by a computing device. More specifically, the description will reference acts and symbolic representations of operations that are performed by one or more computing devices or peripherals, unless indicated otherwise. As such, it will be understood that such acts and operations, which are at times referred to as being computer-executed, include the manipulation by a processing unit of electrical signals representing data in a structured form. This manipulation transforms the data or maintains it at locations in memory, which reconfigures or otherwise alters the operation of the computing device or peripherals in a manner well understood by those skilled in the art. The data structures where data is maintained are physical locations that have particular properties defined by the format of the data.

Generally, program modules include routines, programs, objects, components, data structures, and the like that perform particular tasks or implement particular abstract data types. Moreover, those skilled in the art will appreciate that the computing devices need not be limited to conventional personal computers, and include other computing configurations, including hand-held devices, multi-processor systems, microprocessor based or programmable consumer electronics, network PCs, minicomputers, mainframe computers, and the like. Similarly, the computing devices need not be limited to stand-alone computing devices, as the mechanisms may also be practiced in distributed computing environments where tasks are performed by remote processing devices that are linked through a communications network. In a distributed computing environment, program modules may be located in both local and remote memory storage devices.

Turning to FIG. 1, the system 100 shown therein illustrates an exemplary system for providing computer-generated feedback directed to whether user speech input meets subjective criteria, such as whether the user speech input is persuasive, entertaining, business-like, or other predetermined subjective criteria. A user 150, as shown, can provide spoken input, such as the exemplary spoken input 151, which can be digitized by a computing device, thereby converting the acoustic sounds of the user 150 speaking into digital data in a manner well known to those skilled in the art.

The spoken input 151, in the form of digital data, can be provided to one or more speaking trait detectors, which can analyze the spoken input 151 to identify discrete instances of individual speaking traits. For example, as illustrated by the exemplary system 100 of FIG. 1, the spoken input 151 can be provided to a vocal fry detector, such as the exemplary vocal fry detector 101, which can analyze the spoken input 151 and look for identified audio constructs within the spoken input 151 that are indicative of vocal fry instances. In such a manner, the vocal fry detector 101 can identify discrete instances of vocal fry within the spoken input 151, and can output a numerical quantity of such instances in the form of the vocal fry quantity 111.

In an analogous manner, the spoken input 151 can be provided to a tag questions detector, such as the exemplary tag questions detector 102, which can analyze the spoken input 151 and look for identified audio constructs that are indicative of tag questions. The tag questions detector 102 can, thereby, identify discrete instances of tag questions within the spoken input 151, and can output a numerical quantity of such instances in the form of the tag questions quantity 112. The exemplary uptalk detector 103, filler sounds detector 104, and hedge words detector 105 can, and analogously, detect discrete instances of uptalk, filler sounds and hedge words, respectively, and can output numerical quantities in the form of the uptalk quantity 113, filler sounds quantity 114, and hedge words quantity 150.

The quantities, such as the exemplary vocal fry quantity 111, tag questions quantity 112, uptalk quantity 113, filler sounds quantity 114 and hedge words quantity 115, can be further analyzed to generate individual speaking trait scores upon which user feedback can be provided that is indicative of the spoken input 151 meeting predetermined subjective criteria. According to one aspect, such scoring of individual speaking trait quantities can be based on comparisons between individual speaking trait quantities and predetermined threshold quantities specific to those speaking traits. As one simple example, threshold quantities can be utilized to normalize the detected quantities of various speaking traits. Thus, if the vocal fry quantity 111 is two, reflective of two detected instances of vocal fry in the spoken input 151, by the vocal fry detector 101, but the filler sounds quantity 114 is twenty, reflective of twenty detected instances of filler sounds in the spoken input 151, by the filler sounds detector 104, a straightforward amalgamation of such two quantities can result in the filler sounds quantity dominating the amalgamation. However, if a threshold quantity of vocal fry, such as represented by the vocal fry threshold 121, is one, then the vocal fry quantity 111 detected in the spoken input 151 can be double such a threshold, while, if a threshold quantity of filler sounds, represented by the filler sounds threshold 124, is forty, then the filler sounds quantity 114 detected in the spoken input 151 can be only half of such a threshold. Normalizing based on threshold values therefore, can result in the filler sounds, in the present example, having substantially less effect on an overall value.

Accordingly, in one aspect, a vocal fry scoring component, such as the exemplary vocal fry scoring component 131, can receive, as input, the vocal fry quantity 111 and the vocal fry threshold quantity 121, and can generate a vocal fry score 141 based on those two inputs. More specifically, as one example, the vocal fry scoring component 131 can divide the vocal fry quantity 111 by the vocal fry threshold 121 to generate the vocal fry score 141. As another example, the vocal fry scoring component 131 can utilize standardized distribution curves to express the vocal fry quantity 111 as being within a certain deviation of the vocal fry threshold 121. Other forms of normalizing the vocal fry quantity 111, or otherwise scoring the vocal fry quantity 111, in view of the vocal fry threshold 121, are equally applicable.

Analogously, a tag questions scoring component, such as the exemplary tag questions scoring component 132, can receive, as input, a tag questions quantity 112 and a predetermined tag questions threshold quantity 122 and generate a tag questions score 142. Likewise, exemplary uptalk scoring component 133, filter sound scoring component 134 and hedge words scoring component 135 can receive, respectively, uptalk quantity 113 and uptalk threshold quantity 123, filler sounds quantity 114 and filler sounds threshold quantity 124 and hedge words quantity 115 and hedge words threshold quantity 125, and can correspondingly generate the uptalk score 143, the filler sounds score 144 and the hedge words score 145.

A quantitative score generator can generate an overall score that is based on the quantities of the individual speaking traits detected in the spoken input 151, as normalized by, or otherwise taking into account, corresponding individual speaking trait threshold. An exemplary quantitative score generator 160 is illustrated in the exemplary system 100 of FIG. 1 as aggregating scores of the various speaking traits, such as, for example, the vocal fry score 141, the tag questions score 142, the uptalk score 143, the filler sounds score 144 and the hedge words score 145. Such an aggregation can involve simply summing the individual scores, or it can involve other forms of aggregation, such as averaging.

Individual speaking traits, however, may not be equally indicative of a particular subjective criteria for which the spoken input 151 is being evaluated. For example, if the subjective criteria, for which the spoken input 151 is being evaluated, is confidence, then the use of filler sounds, as would be reflected by the filler sounds score 144 can be more consequential, to a determination of whether the spoken input 151 sounds confident or not, then, for example, the vocal fry score 141. Conversely, if the subjective criteria, for which the spoken input 151 is being evaluated, is listener engagement, or entertainment, then filler sounds, such as reflected by the filler sounds score 144 can be less significant than, for example, tag questions, such as reflected by the tag questions score 144.

To account for such different levels of significance to specific subjective criteria, the exemplary quantitative score generator 160 can weight each of the scores based on a corresponding weight, which can be separately determined, such as in a manner detailed below. For example, the cumulative score generator 160 can multiply each of the scores 141, 142, 143, 144 and 145 by a corresponding weight to achieve a weighted score, and the weighted scores can then be summed to generate an amalgamated speaking trait quantity score.

According to one aspect, the computer-generated feedback to the user 150, of how well their spoken input 151 meets subjective criteria, can be generated based on this aggregated quantitative score. For example, a predetermined threshold can be established such that aggregated quantitative scores below such a threshold are deemed to be representative of spoken input that, overall, when considering all of the various speaking traits with quantities were detected and are then represented within such an aggregated quantitative score, meets the subjective criteria. As indicated previously, such subjective criteria can include whether the spoken input 151 was professional, was entertaining, was persuasive, was engaging, or other like subjective criteria. The establishment of the individual thresholds of the individual speaking traits, and, thus, an overall threshold, will be detailed further below.

According to a further aspect, the aggregated quantitative score, or, more precisely, the amalgamated speaking trait quality score, can be combined with a social value score that can be generated through manual weighting of the individual speaking trait quantities that were detected, such as the exemplary vocal fry quantity 111, tag questions quantity 112, uptalk quantity 113, filler sounds quantity 114 and hedge words quantity 115. For example, the dashed lines of FIG. 1 illustrate the obtaining of such quantities by a social value score generator, such as exemplary social value score generator 170. The exemplary social value score generator 170 can weight or normalize each of such quantities differently from the normalizing, or other type of weighting, performed by the individual scoring components, which was described in detail above. More specifically, the social value score generator 170 can apply weights to the individual speaking trait quantities that can be manually established, or set, thereby enabling user or provider adjustment to the system 100. For example, the manually set weights can be set based on external factors, or independent research. Recent research, for example, indicates that vocal fry in female speakers as very low social value in professional communication, but has moderate value in social communication among same-sex peers. Consequently, a manual weight can be applied to the vocal fry quantity 111, such as by the social value score generator 170, that can increase the weighting applied to the quantity of vocal fry detected in the spoken input 151 if the criteria being evaluated is professional communication, but which can decrease the weighting applied to the quantity of vocal fry detected in the spoken input 151 if the criteria being evaluated his communication among same-sex peers.

In instances where a social value score is generated, such as by a social value score generator 170, a composite score generation component, such as the exemplary composite score generation component 180, can generate a composite score that is based on both that social value score as well as the previously described quantitative score. More specifically, the exemplary composite score generator 180 can amalgamate the quantitative score, or more accurately, the "weighted speaking trait quantity score" that is generated by the quantitative score generator 160, as well as the social value score, or, again, more accurately, the "social value weighted speaking trait score" that is generated by the social value score generator 170. Computer-generated feedback on the spoken input 151 can then be based on such a composite score, generated by the composite score generator 180, again as compared with a threshold. The threshold to which such a composite score can be compared, can be the same as the threshold to which the weighted speaking trait quantity score would have been compared, and the social value score generator 170 can then be utilized to accommodate manual adjustment of the weighted speaking trait quantity score, in view of, for example, current research.

Figure 2:
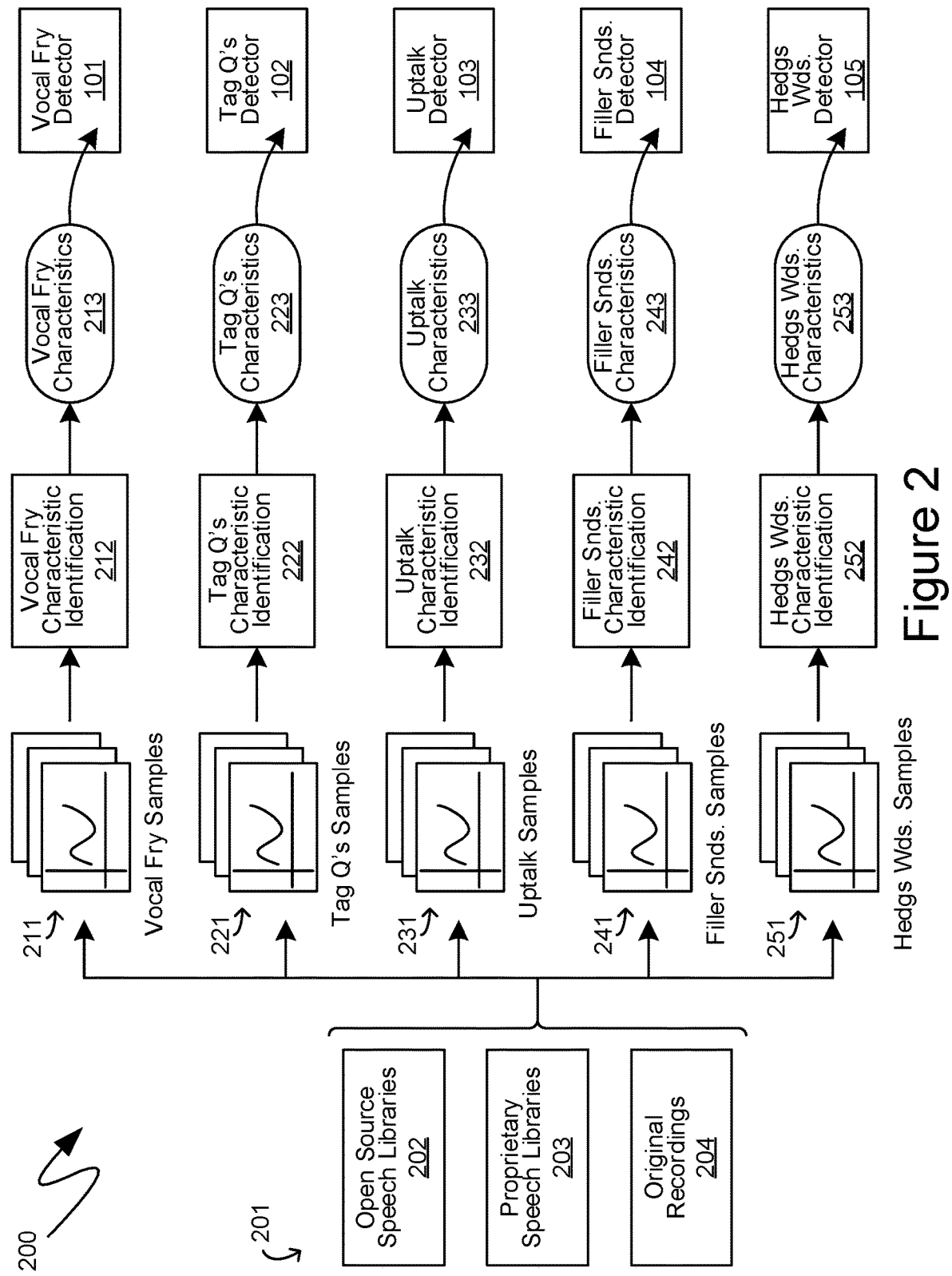
FIG. 2 is a block diagram of an exemplary system for generating detectable characteristics indicative of various speaking traits.

Turning to FIG. 2, the exemplary system 200 shown therein illustrates an exemplary mechanism for deriving characteristics, namely identifiable audio constructs, that can enable the aforementioned speaking trait detectors to detect their corresponding speaking traits. Various sources 201 can be utilized to obtain samples of speaking traits. Such samples can be obtained by human users parsing the sources 201 and to manually identifying individual instances of specific speaking traits, or they can be identified through other means. For purposes of the descriptions herein, the samples identified are considered to accurately portray the speaking traits with which they are associated.

The sources 201 can include open source speech libraries, such as exemplary open-source speech libraries 202, proprietary speech libraries, such as exemplary proprietary speech libraries 203, original recordings, such as the exemplary original recordings 204, or other like sources containing words orally spoken by humans for purposes of communicational speech. From such sources 201, individual samples of individual speaking traits can be identified. For example, a set of samples 211 can comprise samples that are identified as being vocal fry. More specifically, the samples 211 can be those portions of audio, from the sources 201, that are selected as examples of vocal fry. Subsequently, a vocal fry characteristic identification component, such as the exemplary vocal fry characteristic identification component 212 can compare the samples 211 to each other and identify common audio constructs that are present in some, most, or all of the samples 211 and represent the common frequencies, sounds, intonations, patterns, or other like audio constructs among the various samples. Such common audio constructs can then be identified as vocal fry characteristics 213 which can then be part of the vocal fry detector 101 in that the vocal fry detector 101 can reference such vocal fry characteristics 213 and, when finding similar characteristics in an audio sample, such as the aforementioned speech input, the vocal fry detector 101 can determine that, based on the finding of such similar characteristics, that the audio input contains at least one discrete instance of vocal fry.

Analogously, a set of samples 221 can comprise samples that are identified as tag questions. Again, the samples 221 can comprise those portions of audio, from the sources 201, that are specifically extracted and selected to comprise tag question samples. A tag question characteristic identification component, such as the exemplary tag question characteristic identification component 222, can identify audio constructs that are common among some, most, or all of the samples 221, and those common audio constructs can be the tag question characteristics 223 that can then be utilized by the tag question detector 102 to detect subsequent instances of tag question speaking traits. Similarly, an uptalk characteristic identification component 232 can identify uptalk characteristics 233 based upon audio constructs that are common among a set of samples 231 of uptalk, a filler sounds characteristic identification component 242 can identify filler sounds characteristics 243 based upon audio constructs that are common among a set of samples 241 of filler sounds, and a hedge words characteristic identification component 252 can identify hedge words characteristics 253 based upon audio constructs that are common among a set of samples 251 of hedge words.

According to one aspect, the identified characteristics of the speaking traits, such as the exemplary vocal fry characteristics 213 tag question characteristics 223, uptalk characteristics 233, filler sounds characteristics 243 and hedge words characteristics 253, can be refined through iterative feedback mechanisms, which can be applied on an individual speaking trait basis, or in aggregate. For example, to refine the vocal fry characteristics 213, the vocal fry detector 101 can be utilized, either by itself, or together with other detectors, such as the tag questions detector 102, to detect vocal fry in one or more samples that differ from the samples utilized to extract the vocal fry characteristics 213. The vocal fry identified by the vocal fry detector 101 can then be compared with vocal fry detected in those same samples by other means, including by human, or otherwise manual review of those samples. If the vocal fry detected by the vocal fry detector 101 differs from that found manually, and analysis can be performed on both the instances that were identified, by the vocal fry detector 101, utilizing the current vocal fry characteristics 213, as vocal fry, but which were not identified is vocal fry by the manual review, and also on those instances that were identified by the manual review to be vocal fry, but which were not detected by the vocal fry detector 101. In the former instance, audio constructs can be identified that are part of the vocal fry characteristics 213 but are not part of those instances in the new samples that were incorrectly identified, by the vocal fry detector 101, as being vocal fry. Consequently, such audio constructs can be removed and the vocal fry characteristics 213 can be accordingly updated. In the latter instance, audio constructs can be identified that are not part of the current vocal fry characteristics 213 but are part of those instances in the new samples that were not identified as vocal fry, by the vocal fry detector 101, but which should have been. Consequently such audio constructs can be added and the vocal fry characteristics 213 can be updated. Other characteristics, such as the tag questions characteristics 223, uptalk characteristics 233, filler sounds characteristics 243 and hedge words characteristics 253, can, likewise, be updated through one or more feedback cycles in the manner detailed.

Figure 3:
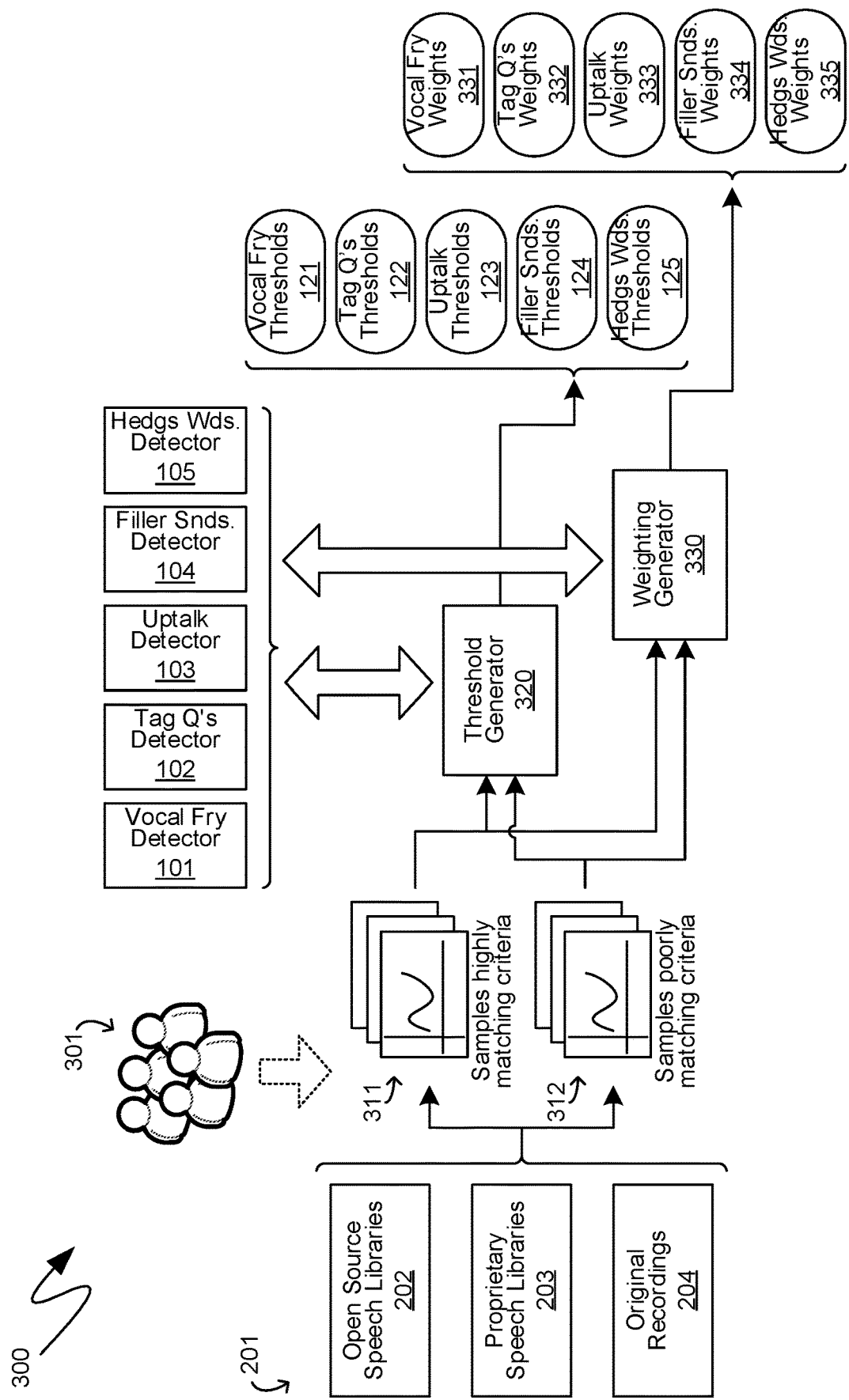
FIG. 3 is a block diagram of an exemplary system for generating threshold quantities and weights to be applied to various speaking traits.

Turning to FIG. 3, exemplary system 300 shown therein illustrates an exemplary mechanism by which individual speaking trait threshold quantities, and weights can be derived for a specific subjective criteria for which the system 100, shown in FIG. 1 and described in detail above, can provide computer-generated feedback of how well the user's speech input meets such subjective criteria. Initially, as illustrated in FIG. 3, one or more sets of samples can be selected from various sources, such as the aforedescribed sources 201. More specifically, exemplary system 300, shown in FIG. 3, visually illustrates two different sets of samples, namely a set of samples 311 that are deemed to highly match the subjective criteria, and a set of samples 312 that are deemed to poorly match the same subjective criteria. For example, as indicated previously, one such subjective criteria can be confidence. In such an example, the set of samples 311 can be samples, selected from the various sources 201, that can have been selected because they were deemed to sound confident. Similarly, the set of samples 312 can be samples, selected from the various sources 201, that can have been selected because they were deemed to not sound confident.

According to one aspect, the selection of the samples in the sense of samples 311 and 312 can be by one or more humans, such as the exemplary humans 301. For example, human analysis of the various sources tool one can be crowdsourced, as that term is utilized by those skilled in the art. Discrete aspects of the various sources 201 can, in such a crowdsourcing aspect, be assigned to various individual humans of a selected set of humans to whom such tasks can be crowdsourced. The humans can rank, rate, or otherwise quantify how confident the speakers of the samples, assigned to such human evaluators, sound. Each sample can be analyzed by multiple humans, and the results amalgamated to enable selection of samples that are deemed to be more universally regarded as sounding confident, namely the samples in the set of samples 311, and, likewise, to enable selection of samples that are deemed to be more universally regarded as not sounding confident, namely the samples in the set of samples 312. Additionally, although illustrated as to alternative sets of samples, other aspects, equally contemplated and usable by the mechanisms described herein, can have a single set of samples that is deemed to match a specific criteria, or more than two sets of samples, such as multiple sets of samples with each set of samples covering a different range of how well those samples meet a specific criteria. Thus, for example, the set of samples 311 could be those samples that were deemed to sound very confident, the set of samples 312 could be those samples that were deemed to sound not confident, and additional sets of samples could be those samples that were deemed to sound somewhat confident, not very confident, slightly confident, or other like intermediate ranges or quantifications.

The sets of samples, such as the exemplary sets of samples 311 and 312, can be provided to a threshold generator component, such as the exemplary threshold generator 320. According to one aspect, the exemplary threshold generator component 320 can utilize the aforedescribed speaking trait detection components, such as the vocal fry detector 101, the tag questions detector 102, the uptalk detector 103, the filler sounds detector 104 and the hedge words detector 105 to detect the quantity of instances of each of such speaking traits within each of the samples in the set of samples 311 and, separately, within each of the samples and the set of samples 312. Based on such quantities, the threshold generator component 320 can generate threshold quantities that can be indicative of a determined demarcation between the quantity of a corresponding speaking trait and the meeting of a specific, predetermined subjective criteria by speech containing such a quantity of speaking traits. For example, the threshold generator 320 can utilize the filler sounds detector 104 to detect instances of filler sounds in each of the samples 311. For example, the threshold generator 320 can determine that the samples 311 have, on average, five instances of filler sounds in each sample. Similarly, the threshold generator 320 can utilize the filler sounds detector 104 to also detect instances of filler sounds in each of the samples 312. For example, the threshold generator 320 can determine that the samples 312 have, on average, twenty instances of filler sounds in each sample. Based on such information, the threshold generator 320 can identify a number greater than five and less than twenty as the filler sounds threshold value 124, with such a threshold demarcating between a quantity of filler sounds in samples that were deemed to highly matching a criteria, such as samples that were deemed to sound confident, in the present example, and a quantity of filler sounds in samples that were deemed too poorly match the criteria, such as samples that were deemed to not sound confident in the present example. The threshold generator 320 can, analogously, generate one or more threshold values for quantities of vocal fry, namely the vocal fry thresholds 121, and, likewise, the tag questions thresholds 122, the uptalk thresholds 123 and the hedge words thresholds 125. As described above with reference to FIG. 1, such thresholds can be utilized to normalize, or otherwise score detected quantities of corresponding speaking traits that are detected in the spoken input provided by the user. Consequently, the vocal fry thresholds 121, tag questions thresholds 122, the uptalk thresholds 123, filler sounds thresholds 124 and hedge words thresholds 125 carry the same identifying numbers in FIG. 3 as they did in FIG. 1.

As indicated previously, individual speaking traits may not be equally indicative of a particular subjective criteria for which the user's spoken input is being evaluated. One mechanism for deriving the weights reflecting an importance of an individual speaking trait to a particular subjective criteria can be to derive a correlation between instances of such an individual speaking trait and samples that have already been determined to either exhibit, or not exhibit, such a subjective criteria. Thus, a weighting generator component, such as the exemplary weighting generator component 330, can, like the exemplary threshold generator component 320, utilize detectors of individual one's of the speaking traits being evaluated, such as the previously described vocal fry detector 101, the tag questions detector 102, the uptalk detector 103, the filler sounds detector 104 and the hedge words detector 105, as illustrated in FIG. 3.

Returning to the above example, the exemplary weighting generator component 330 can, by utilizing the filler sounds detector 104, determine, like the threshold generator component 320 determined in the same manner, that the samples 311 have, on average, five instances of filler sounds in each sample, while the samples 312 have, on average, twenty instances of filler sounds in each sample. Not only in such quantities enable the threshold generator component 320 to generate the aforedescribed thresholds, but such quantities can also enable the weighting generator component 330 to generate corresponding weights. For example, the previously recited example illustrates an inverse correlation between a quantity of filler sounds and a perceived confidence of a sample of speech containing such a quantity of filler sounds. The strength of such a correlation can be the basis for selecting a filler sounds weight, such as the exemplary filler sounds weight 334.

By way of another example, the weighting generator component 330 can utilize the vocal fry detector 101 to determine that the set of samples 311 contains a wide range of vocal fry instances, with some of the samples in the set of samples 311 having only one or two instances of vocal fry, while other samples in the set of samples 311 have as many as ten instances. Continuing such an example, the weighting generator component 330 can further determine, again utilizing the vocal fry detector 101, that the set of samples 312 also contains a wide range of vocal fry instances, with some samples in the set of samples 312 having as few as three instances of vocal fry, while other samples of the set of samples 312 have as many as fifteen instances. As can be seen from such exemplary data, there can be a weak correlation between a quantity of vocal fry instances and a perceived confidence of a speech sample comprising such a quantity of local fry instances, with both samples indicated to sound very confident and samples indicated to not sound confident having, as many as ten instances of vocal fry, and also both samples indicated to sound very confident and samples indicated to not sound confident having, for example, as few as three instances of vocal fry. The weighting generator component 330 can, accordingly, select a lower weight for the vocal fry weights 331. In an analogous manner, the weighting generator component 330 can, likewise, generate the tag question weights 332, uptalk weights 333 and hedge word weights 335. As indicated previously, such empirically derived weights can be utilized to weight individual speaking trait scores for purposes of amalgamating them together into an amalgamated speaking trait quantity score.

By empirically deriving both the criteria by which individual speaking traits are identified in a sample of speech provided by the user, as well as empirically deriving thresholds and weights that are utilized to demarcate between speech that is deemed to meet a preselected subjective criteria, and speech that is not, the aforedescribed mechanisms enable subjective criteria to be based on a quantification that is performable by a computing device. In so doing, the mechanisms described herein enable computing devices to solve problems uniquely arising when attempting to utilize a computing device to empirically perform what a human subjectively performs in a fundamentally different manner. More specifically, no human individually evaluates discrete speaking traits, but rather evaluates whether speech meets the subjective criteria, such as confidence, based on a "gut feel" that is impossible to be performed by a computing device. Mechanisms described herein, therefore, are directed to uniquely computer-based problems that have no analog outside of computing devices. Moreover, the mechanisms described herein are specifically tailored to solve the aforementioned problems plaguing the prior art, which relies on audio comparisons between user input and reference speech, and, thereby, is neither as extensible, nor is universally applicable, the mechanisms described here.

Figure 4:
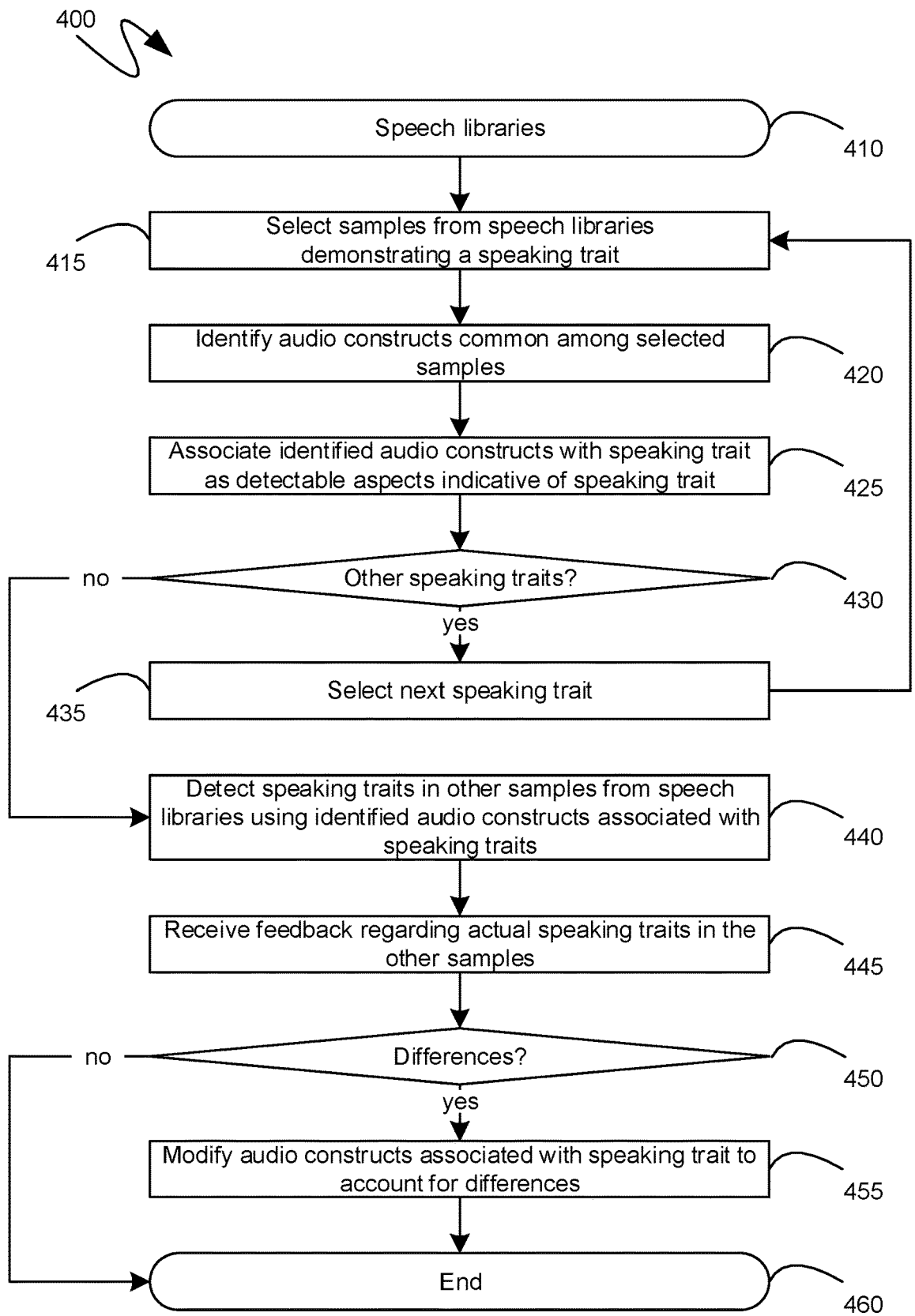
FIG. 4 is a flow diagram of an exemplary series of steps by which detectable characteristics indicative of various speaking traits are generated.

Turning to FIG. 4, the exemplary flow diagram 400 shown therein illustrates an exemplary sequence of steps by which audio constructs can be generated, the audio constructs being indicative of the presence of a particular speaking trait. Initially, at step 410, various speech libraries can be received as input. At step 415, discrete samples of speech from such libraries, received at step 410, can be selected as demonstrative of a particular speaking trait. Multiple such samples can be selected, at step 415, and then subsequently, at step 420, a comparison among such selected samples can identify audio constructs that are common to some, most, or all of the samples selected at step 415. The audio constructs identified at step 420 can then be associated with the corresponding speaking trait such that subsequent efforts to detect such a speaking trait will be made with reference to such audio constructs, as detectable characteristics of such a speaking trait. The process of steps 415 through 425 can be repeated for other speaking traits, as illustrated by steps 430 and 435.

Upon completion, such that, at step 430, it is determined that no further speaking traits require the identification of characteristic audio constructs, processing can proceed to step 440, and, optionally, feedback mechanisms can be utilized to refine the characteristic audio constructs identified and associated with individual speaking traits at steps 420 and 425. More specifically, at step 440, other samples can be provided, and speaking traits within such samples can be detected utilizing the audio constructs associated with the speaking traits at steps 420 and 425. Subsequently, at step 445, feedback can be obtained that is indicative of the presence of actual instances of the speaking traits in those other samples. Such feedback, received at step 445, can be from human users, or can be otherwise deemed to be a definitive, or reference, feedback for purposes of improving the identification of speaking traits. At step 450, differences can be determined between the portions of the samples, received at step 440, that were identified, at step 440, as speaking traits based on previously identified audio constructs, and the feedback, received at step 445. If, at step 450, no differences can be identified, audio constructs associated with the various speaking traits can be deemed to be optimal, and the relevant processing can end at step 460. Conversely, if, at step 450, differences are identified, processing can proceed to step 455 in the audio construct associated with speaking traits can be modified to account for such differences. For example, if there were instances of a speaking trait in the samples from step 440 that were not detected at step 440, but were identified in the feedback received at step 445, then an analysis can be performed as to what audio constructs our present in the instances of the speaking trait that were identified by the feedback received at step 445, but were not in the audio constructs identified at step 420. Those audio constructs can then be added such a new collection of audio constructs can, instead, be utilized as the detectable characteristics by which the speaking trait is detected and identified. Conversely, if there were instances of a speaking trait in the samples from step 440 that were detected at step 440, but were not actually instances of that speaking trait, as represented by the feedback received at step 445, then an analysis can be performed as to what aspects of the audio constructs, identified at step 420, were present in the identified instances of the speaking trait that were not, in fact, instances of that speaking trait. Those audio constructs can then be removed and the remaining audio constructs can, instead, be utilized as detectable characteristics by which the speaking trait is detected and identified.

Figure 5:
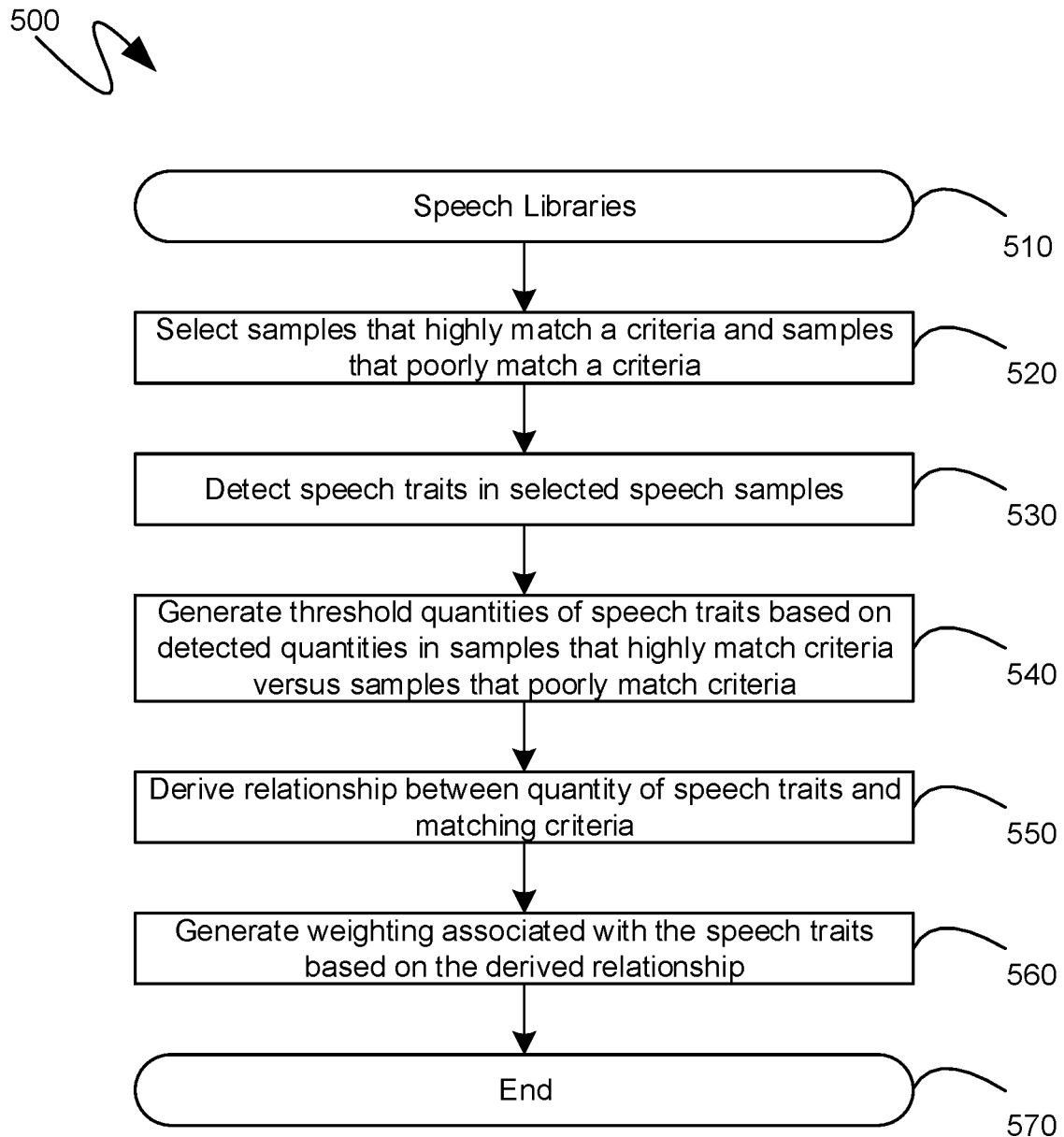
FIG. 5 is a flow diagram of an exemplary series of steps by which threshold quantities and weights to be applied to various speaking traits are generated.

Turning to FIG. 5, the flow diagram 500 shown therein illustrates an exemplary series of steps by which threshold quantities and weights associated with speech traits can be empirically derived. Initially, at step 510, various sources of prerecorded speech, such as speech libraries, can be obtained. Samples that match a particular subjective criteria, such as persuasiveness, confidence, rather like criteria, can be selected at step 520. As indicated previously, the selection of such samples can be crowdsourced such that multiple humans separately consider portions of the speech libraries and a consensus is utilized to identify those samples that such human workers deem to meet a criteria. Additionally, other sets of samples can also be identified at step 520, such as by crowdsourcing or other mechanisms. For example, at step 520, to opposing sets of samples can be selected, with one set of samples comprising samples that are deemed to highly match a criteria, while an opposing set of samples comprises samples that are deemed to poorly match that criteria. As yet another example, at step 520, multiple different strata of samples can be selected such as, for example, samples that highly matching criteria, samples that somewhat match criteria, samples that neither match, nor fail to match, a criteria, and samples that do not match, or poorly match that criteria.

Subsequently, step 530, the criteria identified via the steps of the flow diagram 400 of FIG. 4 can be utilized to detect individual instances of individual speech traits in the sample selected at step 520. At step 540, threshold quantities of speech traits within a speech sample can be generated based on the quantities of the speech traits detected in the sample selected at step 520. More specifically, as detailed above, the generated threshold quantities can be selected such that they are indicative of a determined demarcation between the quantity of a corresponding speaking trait and the meeting of a specific, predetermined subjective criteria by speech containing such a quantity of speaking traits. For example, if it is determined that the samples from the set of samples that highly match as a criteria have, on average, five instances of a particular speaking trait in each sample, but the samples from the set of samples that poorly matches that same criteria has, on average, twenty instances of that particular speaking trait in each sample, a threshold quantity of greater than five and less than twenty can be selected at step 540.

At step 550, a relationship can be derived between the quantity of speech traits detected in the samples of step 520 and the corresponding criteria upon which such samples were selected. Subsequently, at step 560, weights for each of the speech traits can be generated based on the strength of the relationship derived at step 550. The relevant processing can then end at step 570. By way of an example, and as detailed above, if it is determined that samples from a set of samples that highly matches the criteria contains a wide range of instances of a particular speech trait, and the samples from the set of samples that poorly matches the criteria also contain an overlapping range of instances, there can be a weak correlation between a quantity of instances of such a speech trait and the perception of whether or not such speech matches a criteria. Such a determination can be made at step 550, and then, correspondingly, the weighting generated at step 560 can be a reduced weighting or a low value weighting.

Figure 6:
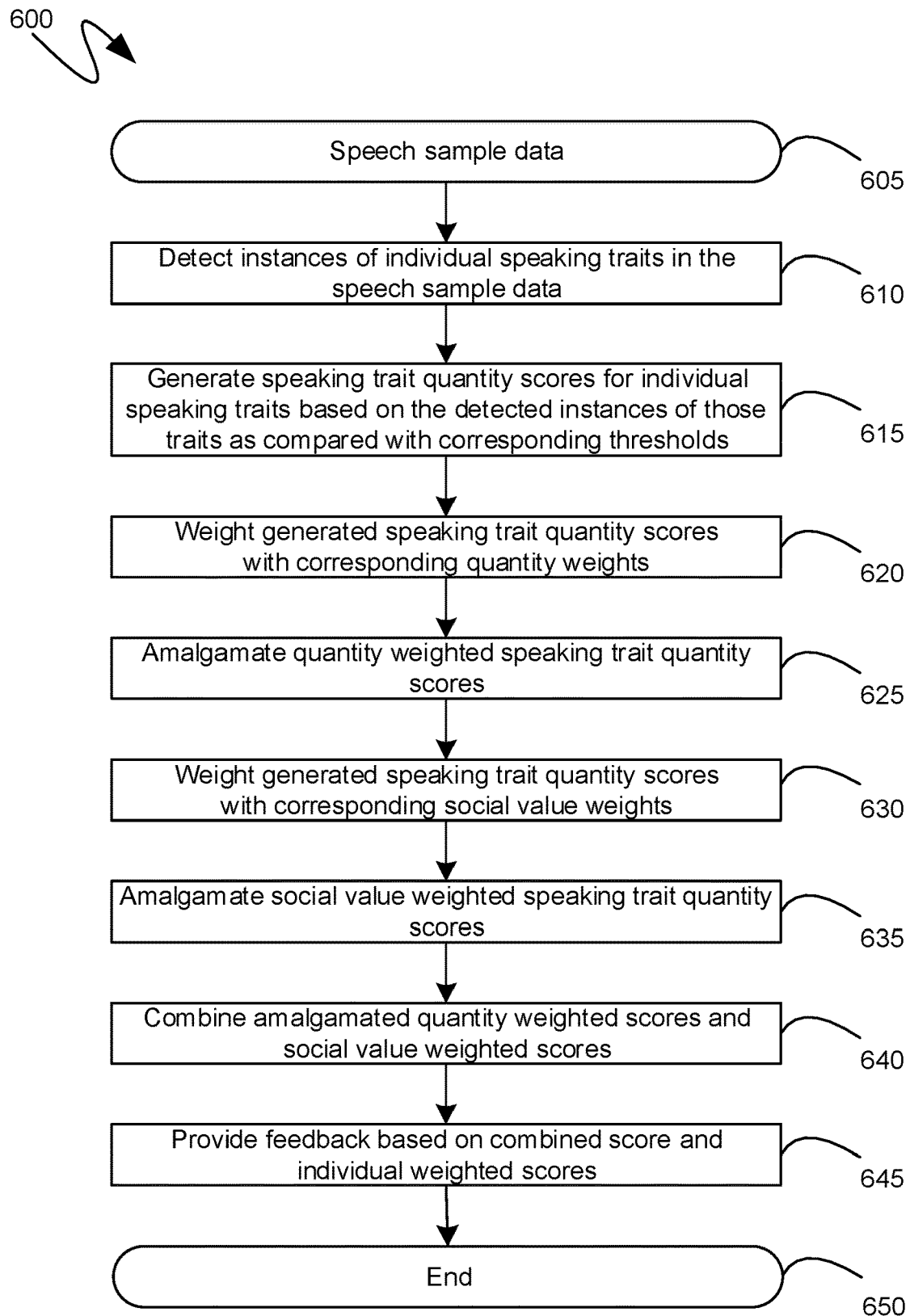
FIG. 6 is a flow diagram of an exemplary series of steps by which computer-generated feedback directed to whether user speech input meets subjective criteria is provided.

Turning to FIG. 6, the flow diagram 600 shown therein illustrates an exemplary series of steps by which the mechanisms described herein can be utilized to provide computer-generated feedback of user speech, specifically whether such user speech needs or does not meet subjective criteria. Initially, at step 605, the user's speech that is to be evaluated can be received in the form of speech sample data, such as by digitizing the user's speech, or otherwise converting the sound of the user speaking into digital data. At step 610, such as by utilizing the audio constructs identified by the steps of the flow diagram 400 of FIG. 4, instances of individual speaking traits in the speech sample data can be detected. Subsequently, at step 615, speaking trait quantity scores can be generated based on a comparison between the detected instances of an individual speaking trait, detected at step 610, and threshold quantities of that speaking trait, such as determined by the steps of the flow diagram 500 of FIG. 5. At step 620, then, the speaking trait quantity scores generated at step 615 can be weighted with corresponding speaking trait quantity weights, such as those also determined by the steps of the flow diagram 500 of FIG. 5.

The individual speaking trait quantity scores, as weighted at step 620, can be amalgamated at step 625, and, according to one aspect, although not explicitly illustrated by the exemplary flow diagram 600 of FIG. 6, computer-generated feedback of the user's speech received at step 605 can be generated based on such an amalgamation. According to an alternative aspect, illustrated by the exemplary flow diagram 600 of FIG. 6, processing can proceed to step 630, and the speaking trait quantity scores, generated at step 615, or, alternatively, the quantity of detected instances of the individual speaking traits, detected at step 610, can be weighted based upon social value weights that can be manually established, thereby providing manual override of otherwise automatic, empirically based analysis. As indicated previously, such manual weighting can be based on external factors, such as independent research, consumer feedback, expert reviews, or other like external factors. At step 635 the social value weighted speaking trait quantity scores, weighted at step 630, can be amalgamated. The amalgamated, weighted scores from steps 625 and 635 can then be combined, at step 640, and the computer-generated feedback can be provided at step 645. More specifically, at step 645, the combined score can be compared as against empirically determined thresholds, and whether such a score is above or below such a threshold different forms of user feedback can be provided. For example, if scores above a threshold are deemed to more properly meet a subjective criteria, then a combined score below such a threshold can result in user feedback indicative that the user needs to change their speaking in order to improve how their speaking is perceived with respect to that subjective criteria. In addition to such overall feedback, feedback as to individual speaking traits can likewise be provided based on comparisons between individual speaking trait quantities and corresponding thresholds. Thus, for example, a user whose speech is determined to, for example, sound confident, but whose vocal fry was above a threshold quantity, can be informed that their speech is deemed to sound confident, but that additional improvement can be obtained by, for example, reducing the instances of vocal fry. In such a manner, computer-generated feedback can be provided to a user that is indicative of how well a user's speech meets subjective criteria.

Figure 7:
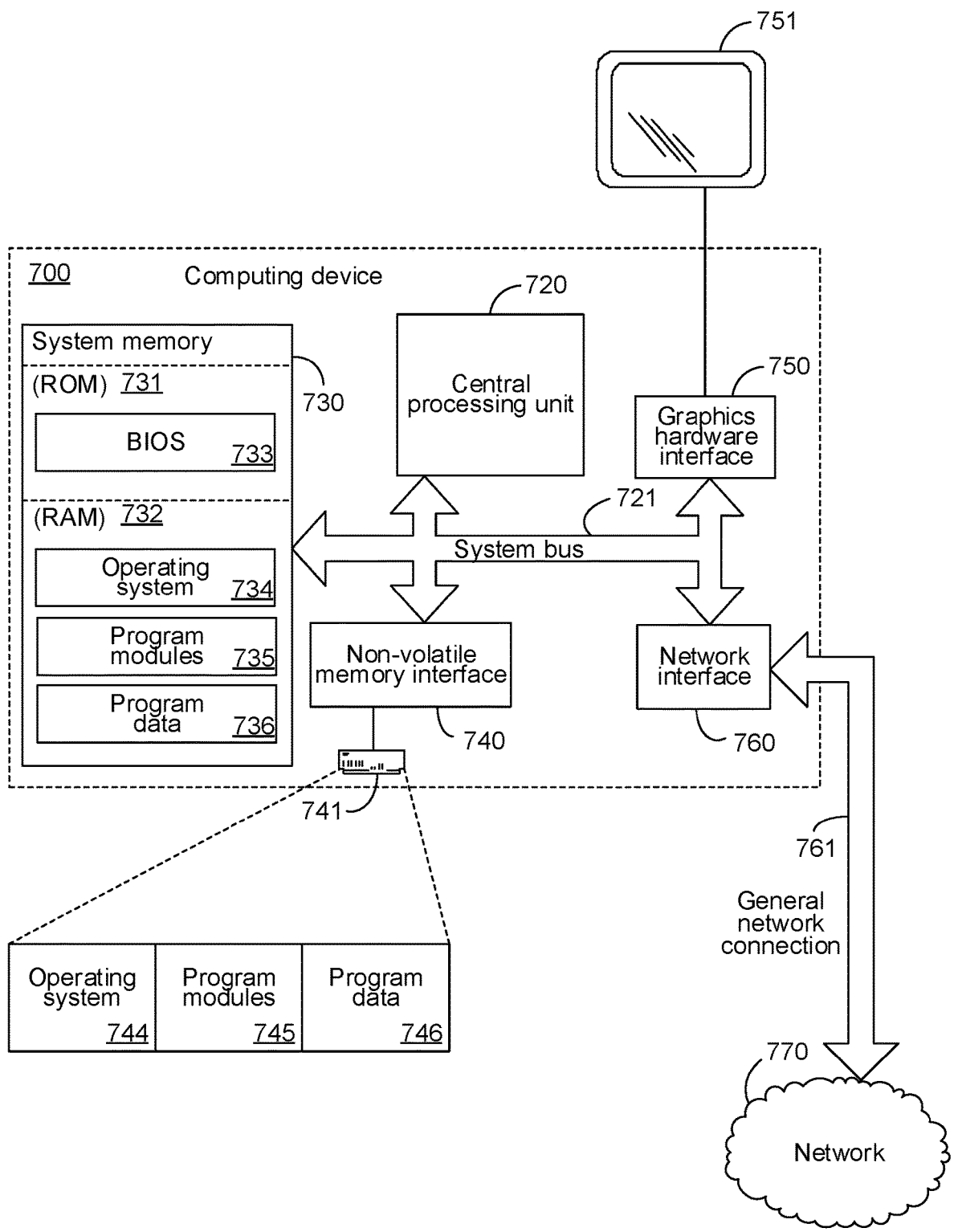
FIG. 7 is a block diagram of an exemplary computing device.

Turning to FIG. 7, an exemplary computing device 700 is illustrated which can perform some or all of the mechanisms and actions described above. The exemplary computing device 700 can include, but is not limited to, one or more central processing units (CPUs) 720, a system memory 730, and a system bus 721 that couples various system components including the system memory to the processing unit 720. The system bus 721 may be any of several types of bus structures including a memory bus or memory controller, a peripheral bus, and a local bus using any of a variety of bus architectures. The computing device 700 can optionally include graphics hardware, including, but not limited to, a graphics hardware interface 750 and a display device 771, which can include display devices capable of receiving touch-based user input, such as a touch-sensitive, or multi-touch capable, display device. Depending on the specific physical implementation, one or more of the CPUs 720, the system memory 730 and other components of the computing device 700 can be physically co-located, such as on a single chip. In such a case, some or all of the system bus 721 can be nothing more than silicon pathways within a single chip structure and its illustration in FIG. 7 can be nothing more than notational convenience for the purpose of illustration.

The computing device 700 also typically includes computer readable media, which can include any available media that can be accessed by computing device 700 and includes both volatile and nonvolatile media and removable and non-removable media. By way of example, and not limitation, computer readable media may comprise computer storage media and communication media. Computer storage media includes media implemented in any method or technology for storage of content such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired content and which can be accessed by the computing device 700. Computer storage media, however, does not include communication media. Communication media typically embodies computer readable instructions, data structures, program modules or other data in a modulated data signal such as a carrier wave or other transport mechanism and includes any content delivery media. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 730 includes computer storage media in the form of volatile and/or nonvolatile memory such as read only memory (ROM) 731 and random access memory (RAM) 732. A basic input/output system 733 (BIOS), containing the basic routines that help to transfer content between elements within computing device 700, such as during start-up, is typically stored in ROM 731. RAM 732 typically contains data and/or program modules that are immediately accessible to and/or presently being operated on by processing unit 720. By way of example, and not limitation, FIG. 7 illustrates operating system 734, other program modules 737, and program data 736.

The computing device 700 may also include other removable/non-removable, volatile/nonvolatile computer storage media. By way of example only, FIG. 7 illustrates a hard disk drive 741 that reads from or writes to non-removable, nonvolatile magnetic media. Other removable/non-removable, volatile/nonvolatile computer storage media that can be used with the exemplary computing device include, but are not limited to, magnetic tape cassettes, flash memory cards, digital versatile disks, digital video tape, solid state RAM, solid state ROM, and other computer storage media as defined and delineated above. The hard disk drive 741 is typically connected to the system bus 721 through a non-volatile memory interface such as interface 740.

The drives and their associated computer storage media discussed above and illustrated in FIG. 7, provide storage of computer readable instructions, data structures, program modules and other data for the computing device 700. In FIG. 7, for example, hard disk drive 741 is illustrated as storing operating system 744, other program modules 747, and program data 746. Note that these components can either be the same as or different from operating system 734, other program modules 737 and program data 746. Operating system 744, other program modules 747 and program data 746 are given different numbers hereto illustrate that, at a minimum, they are different copies.

The computing device 700 may operate in a networked environment using logical connections to one or more remote computers. The computing device 700 is illustrated as being connected to the general network connection 761, and, thus, in turn to the network 770, through a network interface or adapter 760, which is, in turn, connected to the system bus 721. In a networked environment, program modules depicted relative to the computing device 700, or portions or peripherals thereof, may be stored in the memory of one or more other computing devices that are communicatively coupled to the computing device 700 through the general network connection 761. It will be appreciated that the network connections shown are exemplary and other means of establishing a communications link between computing devices may be used.

Although described as a single physical device, the exemplary computing device 700 can be a virtual computing device, in which case the functionality of the above-described physical components, such as the CPU 720, the system memory 730, the network interface 760, and other like components can be provided by computer-executable instructions. Such computer-executable instructions can execute on a single physical computing device, or can be distributed across multiple physical computing devices, including being distributed across multiple physical computing devices in a dynamic manner such that the specific, physical computing devices hosting such computer-executable instructions can dynamically change over time depending upon need and availability. In the situation where the exemplary computing device 700 is a virtualized device, the underlying physical computing devices hosting such a virtualized computing device can, themselves, comprise physical components analogous to those described above, and operating in a like manner. Furthermore, virtual computing devices can be utilized in multiple layers with one virtual computing device executing within the construct of another virtual computing device. The term "computing device", therefore, as utilized herein, means either a physical computing device or a virtualized computing environment, including a virtual computing device, within which computer-executable instructions can be executed in a manner consistent with their execution by a physical computing device. Similarly, terms referring to physical components of the computing device, as utilized herein, mean either those physical components or virtualizations thereof performing the same or equivalent functions.

The descriptions above include, as a first example a computing device comprising: one or more processing units; and one or more computer-readable media comprising computer-executable instructions which, when executed by the one or more processing units, cause the computing device to: receive speech sample data obtained by digitizing audio generated by a user speaking a speech sample; detect instances of individual ones of multiple speaking traits in the speech sample data, each speaking trait being both different from, and independent of, others of the multiple speaking traits; generate, for each of the multiple speaking traits, speaking trait quantity scores by comparing a quantity of detected instances of each speaking trait to a corresponding predetermined speaking trait quantity threshold; generate, for each of the speaking trait quantity scores, weighted speaking trait quantity scores by weighting each of the speaking trait quantity scores with a corresponding predetermined speaking trait quantity weight, each predetermined speaking trait quantity weight being based on an empirically-derived correlation between one of the multiple speaking traits and one or more criteria for which the user's speaking the speech sample is being evaluated; amalgamate the weighted speaking trait quantity scores into an amalgamated speaking trait quantity score; generate, for each of the speaking trait quantity scores, social value weighted speaking trait scores by weighting each of the speaking trait quantity scores with a corresponding predetermined speaking trait social value weight that was manually set; amalgamate the social value weighted speaking trait scores into an amalgamated social value weighted speaking trait score; and provide feedback based on a combination of the amalgamated speaking trait quantity score and the amalgamated social value weighted speaking trait score, the feedback being indicative of the user's speaking the speech sample exhibiting one or more criteria.

A second example is the computing device of the first example, wherein the multiple speaking traits comprise at least two of: vocal fry, uptalk, tag questions, filler sounds or hedge words.

A third example is the computing device of the first example, wherein the multiple speaking traits comprise: vocal fry, uptalk, tag questions, filler sounds and hedge words.

A fourth example is the computing device of the first example, wherein the speaking trait quantity threshold is based on a quantity of instances of that speaking trait that were detected in a set of speech samples that were previously categorized as highly exhibiting the one or more criteria.

A fifth example is the computing device of the first example, wherein the empirically-derived correlation between the one of the multiple speaking traits and the one or more criteria for which the user's speaking the speech sample is being evaluated is based on a quantity of the one of the multiple speaking traits detected in a set of speech samples that were previously categorized as highly exhibiting the one or more criteria and on a quantity of the one of the multiple speaking traits detected in a set of speech samples that were previously categorized as poorly exhibiting the one or more criteria.

A sixth example is the computing device of the first example, wherein the computer-executable instructions for detecting instances of the individual ones of the multiple speaking traits in the speech sample data comprise computer-executable instructions, which, when executed by the one or more processing units, cause the computing device to match portions of the audio generated by the user speaking the speech sample to audio constructs that were previously determined to be representative of the individual ones of the multiple speaking traits.

A seventh example is the computing device of the sixth example, wherein the audio constructs that were previously determined to be representative of the individual ones of the multiple speaking traits were identified by identifying similarities among a set of speech samples that were previously determined to comprise the individual ones of the multiple speaking traits.

An eighth example is t set of one or more computing devices, comprising, in aggregate: one or more processing units; and one or more computer-readable media comprising computer-executable instructions which, when executed by the one or more processing units, cause the set of computing devices to: receive a first set of multiple speech samples, each identified to comprise a first speaking trait; identify a first set of audio constructs that are common among the first set of multiple speech samples; associate the first set of audio constructs with the first speaking trait such that identification of one instance of the first set of audio constructs in a new speech sample causes the set of computing devices to identify that new speech sample as comprising at least one instance of the first speaking trait; repeat the receiving, the identifying, and the associating for each of others of multiple speaking traits, each speaking trait being both different from, and independent of, others of the multiple speaking traits, the multiple speaking traits also comprising the first speaking trait; receive speech sample data obtained by digitizing audio generated by a user speaking a speech sample; detect instances of individual ones of the multiple speaking traits in the speech sample data by reference to the identified audio constructs that were associated with the individual ones of multiple speaking traits; and provide feedback based at least in part on a quantity of detected instances of each speaking trait, the feedback being indicative of the user's speaking the speech sample exhibiting one or more criteria.

A ninth example is the set of computing devices of the eighth example, The set of one or more computing devices of claim 8, wherein the one or more computer-readable media comprise further computer-executable instructions which, when executed by the one or more processing units, cause the set of computing devices to refine the first set of audio constructs by: detecting instances of the first speaking trait in a second set of multiple speech samples; receiving identification of instances of the first speaking trait in the second set of multiple speech samples; comparing the detected instances to the received identification of instances; identifying a first audio construct, from among the first set of audio constructs, that is not present in instances of the first speaking trait that were identified, but is present in instances of the first speaking trait that were detected; and refining the first set of audio constructs by removing the first audio construct from the first set of audio constructs.

A tenth example is the set of computing devices of the eighth example, wherein the one or more computer-readable media comprise further computer-executable instructions which, when executed by the one or more processing units, cause the set of computing devices to refine the first set of audio constructs by: detecting instances of the first speaking trait in a second set of multiple speech samples; receiving identification of instances of the first speaking trait in the second set of multiple speech samples; comparing the detected instances to the received identification of instances; identifying a first audio construct that is present in instances of the first speaking trait that were identified, but is not present in instances of the first speaking trait that were detected; and refining the first set of audio constructs by adding the first audio construct to the first set of audio constructs.

An eleventh example is the set of computing devices of the eighth example, wherein the multiple speaking traits comprise at least two of: vocal fry, uptalk, tag questions, filler sounds or hedge words.

A twelfth example is the set of computing devices of the eighth example, wherein the one or more computer-readable media comprise further computer-executable instructions which, when executed by the one or more processing units, cause the set of computing devices to: generate, for each of the multiple speaking traits, speaking trait quantity scores by comparing the quantity of detected instances of each speaking trait to a corresponding predetermined speaking trait quantity threshold; generate, for each of the speaking trait quantity scores, weighted speaking trait quantity scores by weighting each of the speaking trait quantity scores with a corresponding predetermined speaking trait quantity weight, each predetermined speaking trait quantity weight being based on an empirically-derived correlation between one of the multiple speaking traits and one or more criteria for which the user's speaking the speech sample is being evaluated; amalgamate the weighted speaking trait quantity scores into an amalgamated speaking trait quantity score; generate, for each of the speaking trait quantity scores, social value weighted speaking trait scores by weighting each of the speaking trait quantity scores with a corresponding predetermined speaking trait social value weight that was manually set; and amalgamate the social value weighted speaking trait scores into an amalgamated social value weighted speaking trait score; wherein the providing the feedback is further based on a combination of the amalgamated speaking trait quantity score and the amalgamated social value weighted speaking trait score.

A thirteenth example is the set of computing devices of the eighth example, wherein the speaking trait quantity threshold is based on a quantity of instances of that speaking trait that were detected in a set of speech samples that were previously categorized as highly exhibiting the one or more criteria.

A fourteenth example is the computing device of the eighth example, wherein the empirically-derived correlation between the one of the multiple speaking traits and the one or more criteria for which the user's speaking the speech sample is being evaluated is based on a quantity of the one of the multiple speaking traits detected in a set of speech samples that were previously categorized as highly exhibiting the one or more criteria and on a quantity of the one of the multiple speaking traits detected in a set of speech samples that were previously categorized as poorly exhibiting the one or more criteria.

A fifteenth example is a method of providing computer-generated feedback that is indicative of a user's speaking a speech sample exhibiting one or more criteria, the method comprising the steps of: receive speech sample data obtained by digitizing audio generated by the user speaking the speech sample; detect instances of individual ones of multiple speaking traits in the speech sample data, each speaking trait being both different from, and independent of, others of the multiple speaking traits; generate, for each of the multiple speaking traits, speaking trait quantity scores by comparing a quantity of detected instances of each speaking trait to a corresponding predetermined speaking trait quantity threshold; generate, for each of the speaking trait quantity scores, weighted speaking trait quantity scores by weighting each of the speaking trait quantity scores with a corresponding predetermined speaking trait quantity weight, each predetermined speaking trait quantity weight being based on an empirically-derived correlation between one of the multiple speaking traits and one or more criteria for which the user's speaking the speech sample is being evaluated; amalgamate the weighted speaking trait quantity scores into an amalgamated speaking trait quantity score; generate, for each of the speaking trait quantity scores, social value weighted speaking trait scores by weighting each of the speaking trait quantity scores with a corresponding predetermined speaking trait social value weight that was manually set; amalgamate the social value weighted speaking trait scores into an amalgamated social value weighted speaking trait score; and provide feedback based on a combination of the amalgamated speaking trait quantity score and the amalgamated social value weighted speaking trait score, the feedback being indicative of the user's speaking the speech sample exhibiting one or more criteria.

A sixteenth example the method of the fifteenth example, further comprising the steps of: receive a first set of multiple speech samples, each identified to comprise a first speaking trait from among the multiple speaking traits; identify a first set of audio constructs that are common among the first set of multiple speech samples; associate the first set of audio constructs with the first speaking trait such that identification of one instance of the first set of audio constructs in a new speech sample identifies that new speech sample as comprising at least one instance of the first speaking trait; and repeat the receiving, the identifying, and the associating for each of others of the multiple speaking traits; wherein the detecting the instances of the individual ones of the multiple speaking traits in the speech sample data is performed by reference to the identified audio constructs that were associated with the individual ones of multiple speaking traits.

A seventeenth example is the method of the fifteenth example; wherein the multiple speaking traits comprise at least two of: vocal fry, uptalk, tag questions, filler sounds or hedge words.

An eighteenth example is the method of the fifteenth example; wherein the multiple speaking traits comprise: vocal fry, uptalk, tag questions, filler sounds and hedge words.

A nineteenth example is the computing device of the sixteenth example, wherein the one or more computer-readable media comprise further computer-executable instructions which, when executed by the one or more processing units, cause the computing device to: identify a visual height of a first font name textual content as visually rendered on the display device; select a size of a first single, cohesive glyph such that a visual height of a first sample textual content for the identified user interface language of the computing device in a first font matches the identified visual height of the first font name textual content, the first font having the first font name; wherein the first single, cohesive glyph comprises the first sample textual content for the identified user interface language of the computing device in the first font.

A twentieth example is the method of the fifteenth example, wherein the empirically-derived correlation between the one of the multiple speaking traits and the one or more criteria for which the user's speaking the speech sample is being evaluated is based on a quantity of the one of the multiple speaking traits detected in a set of speech samples that were previously categorized as highly exhibiting the one or more criteria and on a quantity of the one of the multiple speaking traits detected in a set of speech samples that were previously categorized as poorly exhibiting the one or more criteria.

As can be seen from the above descriptions, mechanisms for computer-generated feedback directed to whether user speech input meets subjective criteria have been presented. In view of the many possible variations of the subject matter described herein, we claim as our invention all such embodiments as may come within the scope of the following claims and equivalents thereto.

We claim:

1. A computing device comprising:
one or more processing units; and
one or more computer-readable media comprising computer-executable instructions which, when executed by the one or more processing units, cause the computing device to:
receive speech sample data obtained by digitizing audio generated by a user speaking a speech sample;
detect instances of individual ones of multiple speaking traits in the speech sample data;
generate, for each of the multiple speaking traits, speaking trait quantity scores by normalizing a quantity of detected instances of each speaking trait by dividing the quantity of detected instances of each speaking trait with a corresponding predetermined speaking trait quantity normalization threshold;
generate, for each of the speaking trait quantity scores, weighted speaking trait quantity scores by weighting each of the speaking trait quantity scores with a corresponding predetermined speaking trait quantity weight, each predetermined speaking trait quantity weight being based on an empirically-derived correlation between one of the multiple speaking traits and one or more criteria for which the user's speaking the speech sample is being evaluated;
amalgamate the weighted speaking trait quantity scores into an amalgamated speaking trait quantity score; and
provide feedback based on the amalgamated speaking trait quantity score, the feedback being indicative of the user's speaking the speech sample exhibiting one or more criteria;
wherein the empirically-derived correlation between the one of the multiple speaking traits and the one or more criteria for which the user's speaking the speech sample is being evaluated is based on a quantity of the one of the multiple speaking traits detected in a set of speech samples that were previously categorized as highly exhibiting the one or more criteria and on a quantity of the one of the multiple speaking traits detected in a set of speech samples that were previously categorized as poorly exhibiting the one or more criteria.

2. The computing device of claim 1, wherein the computer-executable instructions for detecting instances of the individual ones of the multiple speaking traits in the speech sample data comprise computer-executable instructions, which, when executed by the one or more processing units, cause the computing device to match portions of the audio generated by the user speaking the speech sample to audio constructs that were previously determined to be representative of the individual ones of the multiple speaking traits.

3. The computing device of claim 2, wherein the audio constructs that were previously determined to be representative of the individual ones of the multiple speaking traits were identified by identifying similarities among a set of speech samples that were previously determined to comprise the individual ones of the multiple speaking traits.

4. The computing device of claim 1, wherein the multiple speaking traits comprise at least two of: vocal fry, uptalk, tag questions, filler sounds or hedge words.

5. The computing device of claim 1, wherein the multiple speaking traits comprise: vocal fry, uptalk, tag questions, filler sounds and hedge words.

6. The computing device of claim 1, wherein the speaking trait quantity threshold is based on a quantity of instances of that speaking trait that were detected in a set of speech samples that were previously categorized as highly exhibiting the one or more criteria.

7. A set of one or more computing devices, comprising, in aggregate:
one or more processing units; and
one or more computer-readable media comprising computer-executable instructions which, when executed by the one or more processing units, cause the set of computing devices to:
receive a first set of multiple speech samples, each identified to comprise a first speaking trait;
identify a first set of audio constructs that are common among the first set of multiple speech samples;
associate the first set of audio constructs with the first speaking trait such that identification of one instance of the first set of audio constructs in a new speech sample causes the set of computing devices to identify that new speech sample as comprising at least one instance of the first speaking trait;
repeat the receiving, the identifying, and the associating for each of others of multiple speaking traits;
receive a second set of multiple speech samples, each categorized as highly exhibiting a first criteria;
receive a third set of multiple speech samples, each categorized as poorly exhibiting the first criteria;
detect instances of the first speaking trait in the second set of multiple speech samples;
separately detect instances of the first speaking trait in the third set of multiple speech samples;
generate a predetermined speaking trait quantity weight for the first speaking trait based on a quantity of the detected instances of the first speaking trait in the second set of multiple speech samples and a quantity of the detected instances of the first speaking trait in the third set of multiple speech samples;
repeat the receiving, the detecting and the generating for each of the others of the multiple speaking traits;
receive speech sample data obtained by digitizing audio generated by a user speaking a speech sample;
detect instances of individual ones of the multiple speaking traits in the speech sample data by reference to the identified audio constructs that were associated with the individual ones of multiple speaking traits; and
provide feedback based at least in part on a quantity of detected instances of each speaking trait, the feedback being indicative of the user's speaking the speech sample exhibiting one or more criteria.

8. The set of one or more computing devices of claim 7, wherein the one or more computer-readable media comprise further computer-executable instructions which, when executed by the one or more processing units, cause the set of computing devices to:
generate, for each of the multiple speaking traits, speaking trait quantity scores by normalizing the quantity of detected instances of each speaking trait by dividing the quantity of detected instances of each speaking trait with a corresponding predetermined speaking trait quantity normalization threshold;
generate, for each of the speaking trait quantity scores, weighted speaking trait quantity scores by weighting each of the speaking trait quantity scores with a corresponding predetermined speaking trait quantity weight, each predetermined speaking trait quantity weight being based on an empirically-derived correlation between one of the multiple speaking traits and one or more criteria for which the user's speaking the speech sample is being evaluated;
amalgamate the weighted speaking trait quantity scores into an amalgamated speaking trait quantity score;
wherein the providing the feedback is further based on the amalgamated speaking trait quantity score.

9. The set of one or more computing devices of claim 8, wherein the speaking trait quantity normalization threshold is based on a quantity of instances of that speaking trait that were detected in a set of speech samples that were previously categorized as highly exhibiting the one or more criteria.

10. The set of one or more computing devices of claim 8, wherein the empirically-derived correlation between the one of the multiple speaking traits and the one or more criteria for which the user's speaking the speech sample is being evaluated is based on a quantity of the one of the multiple speaking traits detected in a set of speech samples that were previously categorized as highly exhibiting the one or more criteria and on a quantity of the one of the multiple speaking traits detected in a set of speech samples that were previously categorized as poorly exhibiting the one or more criteria.

11. The set of one or more computing devices of claim 7, wherein the one or more computer-readable media comprise further computer-executable instructions which, when executed by the one or more processing units, cause the set of computing devices to refine the first set of audio constructs by:
detecting instances of the first speaking trait in a fourth set of multiple speech samples;
receiving identification of instances of the first speaking trait in the fourth set of multiple speech samples;
comparing the detected instances to the received identification of instances;
identifying a first audio construct, from among the first set of audio constructs, that is not present in instances of the first speaking trait that were identified, but is present in instances of the first speaking trait that were detected; and
refining the first set of audio constructs by removing the first audio construct from the first set of audio constructs.

12. The set of one or more computing devices of claim 7, wherein the one or more computer-readable media comprise further computer-executable instructions which, when executed by the one or more processing units, cause the set of computing devices to refine the first set of audio constructs by:
- detecting instances of the first speaking trait in a fourth set of multiple speech samples;
- receiving identification of instances of the first speaking trait in the fourth set of multiple speech samples;
- comparing the detected instances to the received identification of instances;
- identifying a first audio construct that is present in instances of the first speaking trait that were identified, but is not present in instances of the first speaking trait that were detected; and
- refining the first set of audio constructs by adding the first audio construct to the first set of audio constructs.

13. The set of one or more computing devices of claim 7, wherein the multiple speaking traits comprise at least two of: vocal fry, uptalk, tag questions, filler sounds or hedge words.

14. A method of providing computer-generated feedback that is indicative of a user's speaking a speech sample exhibiting one or more criteria, the method comprising the steps of:
- receive speech sample data obtained by digitizing audio generated by the user speaking the speech sample;
- detect instances of individual ones of multiple speaking traits in the speech sample data;
- generate, for each of the multiple speaking traits, speaking trait quantity scores by normalizing a quantity of detected instances of each speaking trait by dividing the quantity of detected instances of each speaking trait with a corresponding predetermined speaking trait quantity normalization threshold;
- generate, for each of the speaking trait quantity scores, weighted speaking trait quantity scores by weighting each of the speaking trait quantity scores with a corresponding predetermined speaking trait quantity weight, each predetermined speaking trait quantity weight being based on an empirically-derived correlation between one of the multiple speaking traits and one or more criteria for which the user's speaking the speech sample is being evaluated;
- amalgamate the weighted speaking trait quantity scores into an amalgamated speaking trait quantity score; and
- provide feedback based on the amalgamated speaking trait quantity score, the feedback being indicative of the user's speaking the speech sample exhibiting one or more criteria;
- wherein the empirically-derived correlation between the one of the multiple speaking traits and the one or more criteria for which the user's speaking the speech sample is being evaluated is based on a quantity of the one of the multiple speaking traits detected in a set of speech samples that were previously categorized as highly exhibiting the one or more criteria and on a quantity of the one of the multiple speaking traits detected in a set of speech samples that were previously categorized as poorly exhibiting the one or more criteria.

15. The method of claim 14, further comprising the steps of:
- receive a first set of multiple speech samples, each identified to comprise a first speaking trait from among the multiple speaking traits;
- identify a first set of audio constructs that are common among the first set of multiple speech samples;
- associate the first set of audio constructs with the first speaking trait such that identification of one instance of the first set of audio constructs in a new speech sample identifies that new speech sample as comprising at least one instance of the first speaking trait; and
- repeat the receiving, the identifying, and the associating for each of others of the multiple speaking traits;
- wherein the detecting the instances of the individual ones of the multiple speaking traits in the speech sample data is performed by reference to the identified audio constructs that were associated with the individual ones of multiple speaking traits.

16. The method of claim 14, wherein the multiple speaking traits comprise at least two of: vocal fry, uptalk, tag questions, filler sounds or hedge words.

17. The method of claim 14, wherein the multiple speaking traits comprise: vocal fry, uptalk, tag questions, filler sounds and hedge words.

18. The method of claim 14, wherein the speaking trait quantity normalization threshold is based on a quantity of instances of that speaking trait that were detected in a set of speech samples that were previously categorized as highly exhibiting the one or more criteria.

* * * * *